Patented Jan. 26, 1954

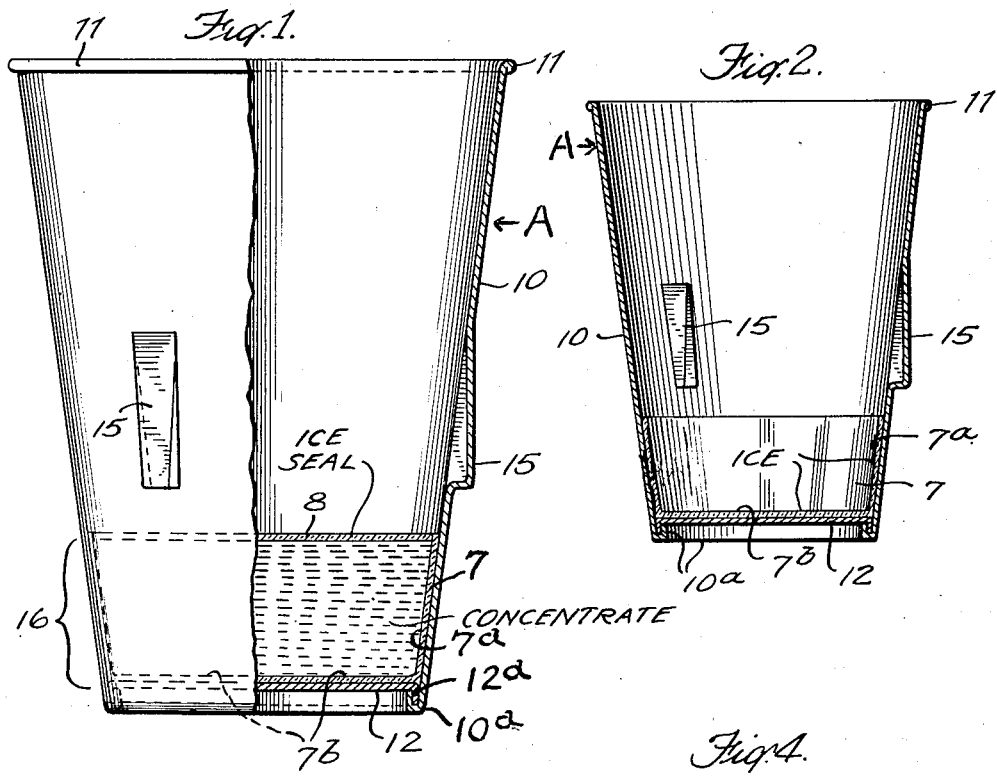
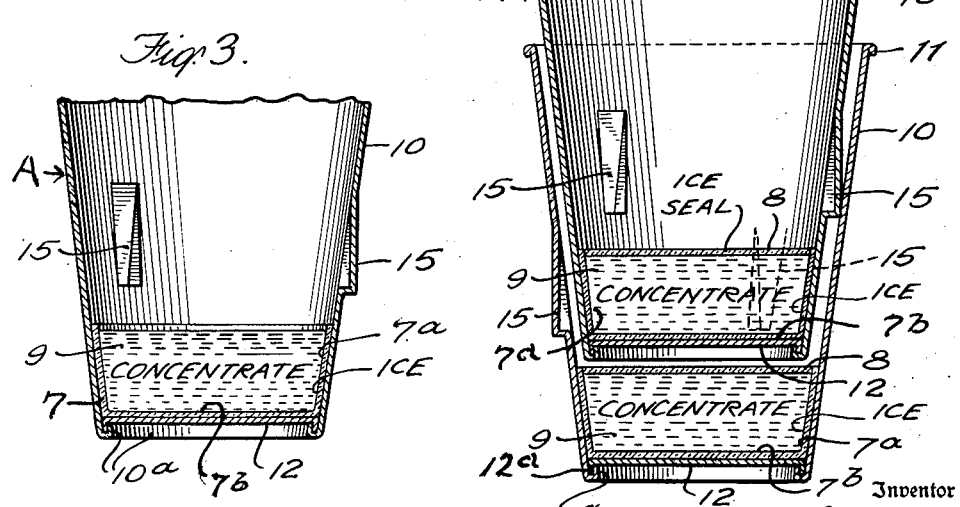

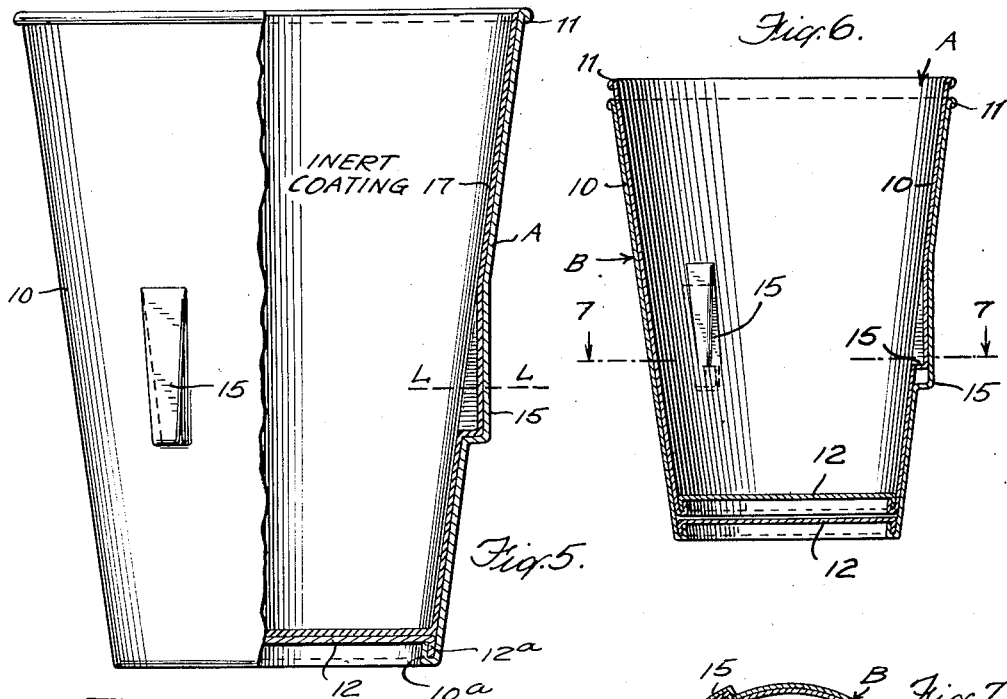
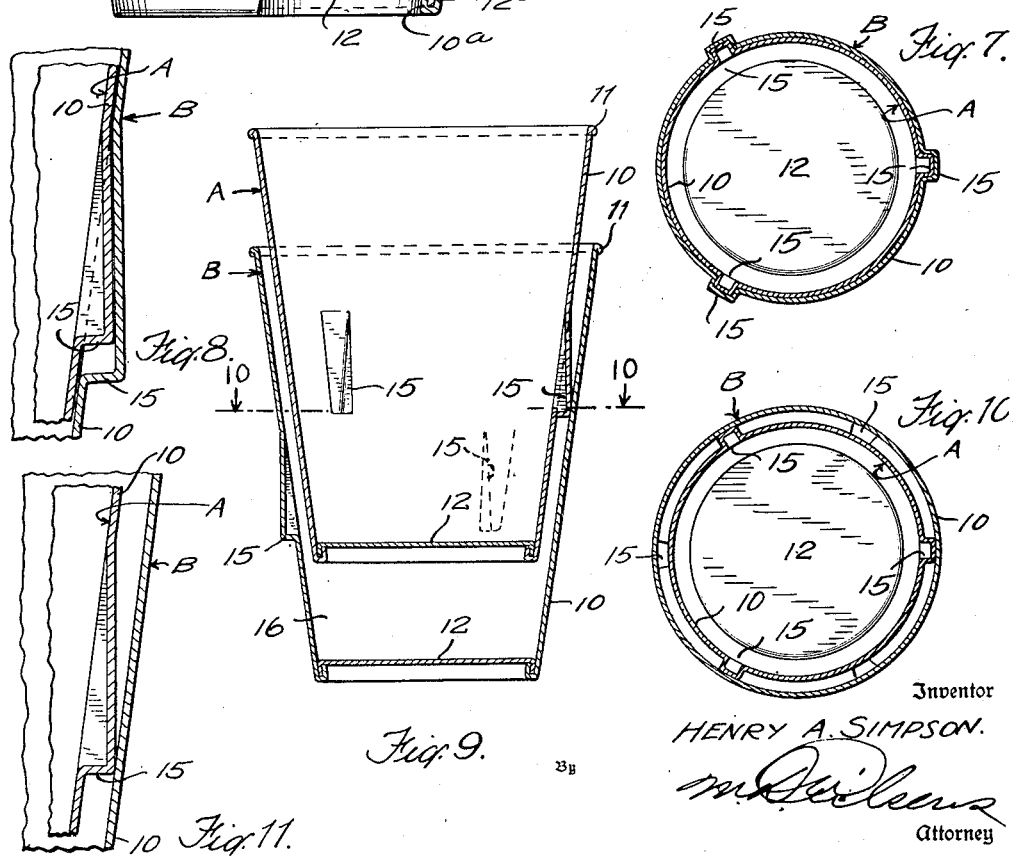

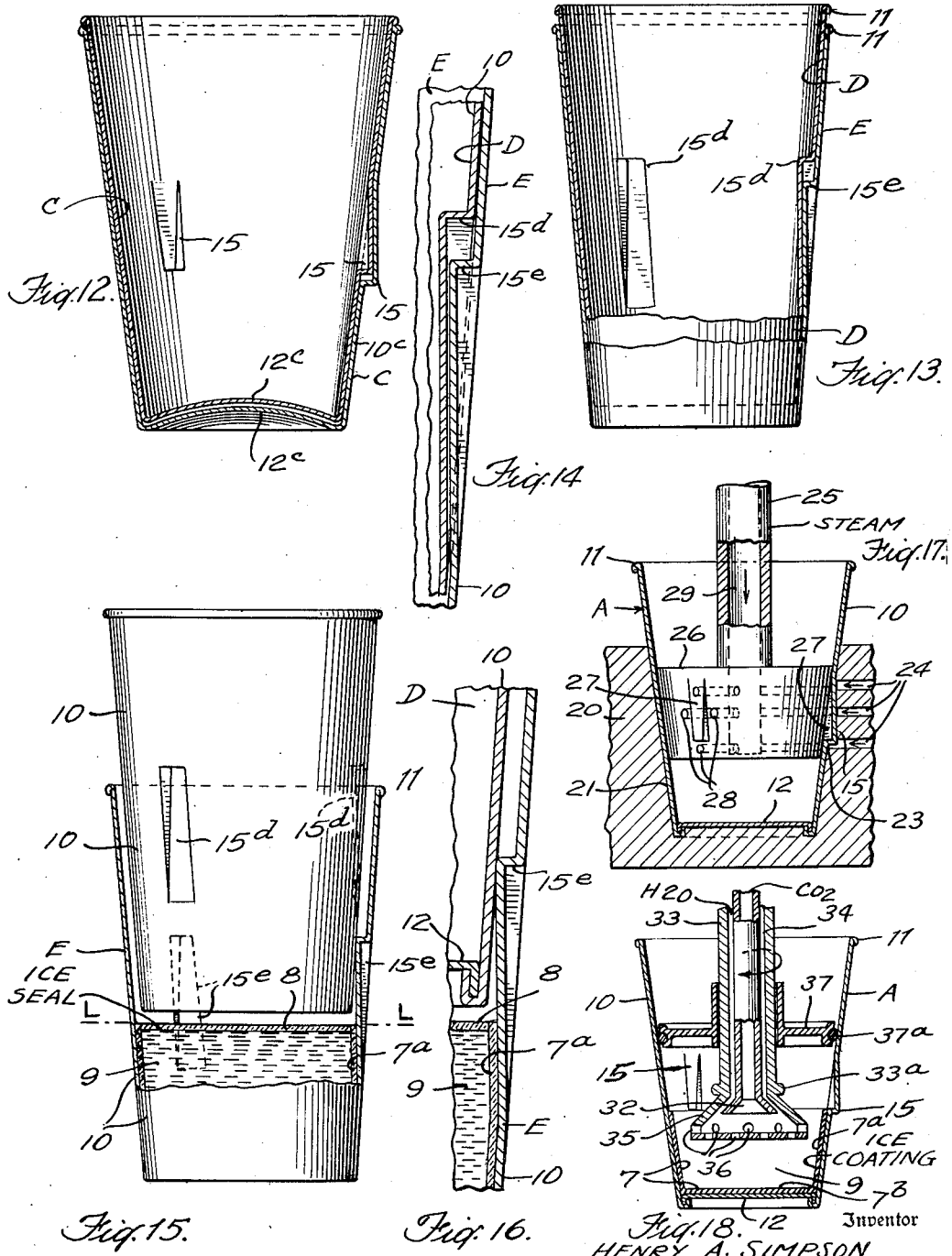

2,667,423

UNITED STATES PATENT OFFICE 2,667,423

PACKAGING, STORING, AND VENDING FROZEN CONCENTRATES AND THE LIKE

Henry A. Simpson, Oviedo, Fla.

Application October 5, 1951, Serial No. 249,953

14 Claims. (Cl. 99—171)

This invention relates to food and/or beverage forming concentrates, and other materials capable of being stored, kept or preserved at sub-freezing temperatures, and to the packaging, storage, and vending thereof.

Heretofore, the packaging, storage, and vending of food and/or beverage forming concentrates such as frozen unpasteurized citrus and other fruit and vegetable concentrates, and other materials capable of storage and preservation at sub-freezing temperatures, has been extremely difficult and commercially impractical because of the rigid food purity and health regulations and laws which must be met and the quickness and readiness with which the residues of these concentrates, and their mixtures, sour, or spoil and poison or contaminate the surfaces upon which they are deposited or precipitated in passage through and/or storage in pipes, conduits, containers, etc. (as well as by accidental leakage and dripping). These surfaces are exposed to air and are not readily maintained at all times clean and sterile and at extremely low sub-freezing temperatures. The presence of air fosters or accelerates the growth of harmful organisms such as baceteria etc. The maintenance of the desirable conditions of sterility, freedom from air and adequately low, sub-freezing temperatures is extremely costly, if not commercially prohibitive. Frequent laborious sterilization and cleaning of all surfaces contacted by the concentrates and like fresh materials, and the necessity for intricate, expensive machinery requiring frequent servicing have, in general, proven effective deterrents to the vending of such unpasteurized concentrates commercially and especially in coin operated dispensers or machines. Instead, the coin operated dispensing machines or boxes which are now a familiar part of the American scene most generally dispense pasteurized concentrates and other products of distinctly inferior flavor and nutritive value because of destruction of original properties and vitamins and other values in the pasteurizing process and the addition of sugar, or in some cases even more undesirable preservatives.

While some few experimental units for dispensing unpasteurized frozen citrus concentrates in paper cups have been and are now being tested under simulated commercial conditions, these units like the widely prevalent dispensing units which dispense pasteurized concentrates and like materials, store the concentrate in temperature controlled tanks whence it is metered and pumped through mixing valves which add and mix the diluent (generally water) therewith and the mixture is then pumped through suitable jets to the receiving paper cups. The contact of the concentrate and the concentrate-water mixture with the various surfaces of the tanks, pumps, valves, etc., contaminates or poisons these surfaces and necessitates extremely frequent cleaning and sterilization of these parts and surfaces as pointed out above.

Furthermore, the mechanisms and controls requisite to the carrying out of the above described method of dispensing or vending are extremely intricate, expensive, requiring substantial initial outlay, very great service expense and unremitting care as well as frequent and expensive repairs and consequent loss of operating time and earning capacity.

Now, according to this invention, the above disadvantages and objections are obviated by providing a new and improved method of packaging and storing concentrates in paper cups each of which contains a quantity forming with the diluent (such as water) which is added and stirred therewith immediately prior to delivery to the consumer, a single drink corresponding in size to the denomination of the coin which initiates the dispensing cycle preferably in a coin operated vending machine or dispensing unit. Since, after packaging, the concentrate never comes into contact with any surfaces whatsoever outside the cup, it cannot contaminate any such surfaces and necessitate cleaning and sterilization thereof, nor, conversely, can it become contaminated by any previous deposits, or precipitates upon such surfaces. Thus, it is an important feature of this invention that there is no handling of the concentrate, except of each filled paper cup as a unit, between the packaging thereof and the mixing and stirring of the diluent therewith, still within the cup, immediately prior to delivery to the consumer.

Since there is invariably a small quantity of air entrapped in each vacuum packed can of unpasteurized concentrate, or other material because of the impossibility of attaining perfect vacuums in such cans, it is necessary in storage to manitain such canned unpasteurized concentrates at temperature ranges below approximately 20° F. to prevent the bacteria and other organisms therein from growing or "working" because of the presence of air. According to this invention, it is merely necessary to maintain storage temperatures of such unpasteurized concentrates below freezing, or 32° F., because there is absolutely no air in contact with the packaged unpasteurized concentrate or like material contained in each unit comprising a packaged single drink forming quantity of the concentrate which (whether fruit or vegetable juice, or other material, is encased in a thin walled shell or casing of ice which casing or shell is so applied as positively to prevent entrapment of air therein; so long as the ice shell or casing is intact no contact of the packaged materials with air may occur and so long as the ice shell or casing remains unmelted (below 32° F.) the ice shell or casing remains intact. In addition, the chemically inert ice walls of the shell or casing isolate the cup walls from the packaged concentrate and prevent the attack of the walls by any of the components of the packaged materials while structurally strengthening or reinforcing the paper cup walls. Furthermore, this reinforcement of the cup walls may, in many cases, eliminate the need of costly wax and other coatings on substantial areas of cup walls and it is notable that omission of such coatings from the inside wall surfaces to receive the ice of the protective shell or casing will enhance security of attachment of the ice to the paper cup wall.

In addition, where the material handled is beverage forming unpasteurized concentrate, I preferably provide the cups (which are otherwise of conventional "Dixie" or "Lily" type with frusto-conical side walls) with spacings means, either integral with the cup walls as herein illustrated, or as separate attachments by means of which the packaged units (each comprising a cup containing a predetermined quantity of concentrate encased in a thin walled ice shell or casing) may be telescopically arranged in predetermined spaced relation to form stacks wherein the individual units or cups are rendered self-centering, wherein the areas of contact between adjacent units are limited to facilitate removal of end units from the stacks, and wherein these limited areas of contact occur beyond and totally independently of the packaged contents of the cup units. As explained above, after removal of each unit from a stack, diluent may be added and stirred with the concentrate (with concurrent melting of the protective ice shell or casing) and the mixed drink made ready for consumption. Naturally, the contents of the top cup may be diluted and stirred before removal, if desired.

While the following description and the drawing describe and illustrate the application of the principles of this invention to containers of cup form particularly adapted to be handled by coin operated and other vending machines of extremely cheap, simple and efficient type, it is, of course, to be understood that the types of containers which may be used to achieve the advantages of this invention in packaging and storing materials of the above described types, and in vending them also, may vary within extremely wide limits, depending upon the quantities desired in the packages and the manner in which the packages are to be used and/or handled.

Thus, objects and advantages of this invention comprise the provision of a new method of packaging unpasteurized concentrates and like materials which may be introduced in fluent form into shells or casings of ice, which makes possible the safe storage thereof at temperatures but slightly below the freeze point (32° F.) instead of at much lower temperature ranges and effecting great economy in the cooling "duty" or energy necessary for safe storage of the materials; which make possible the use of relatively cheap, simple and extremely efficient dispensing devices requiring but little and infrequent cleaning, sterilization, and service since there is no contact of the packaged material with any surfaces outside the package container (such as the illustrated cups), and which is capable of utilizing cheap, common or conventional paper cups with but little modification which may be cheaply, conveniently and readily accomplished.

These and other objects and advantages of the invention will clearly appear from the following description, and the accompanying drawing forming a part thereof, and will be pointed out in the appended claims.

In the drawing:

Fig. 1 is an enlarged view, in elevation, and partly in section, illustrating a unit comprising a cup or container filled with a predetermined quantity of "frosted" or "frozen" unpasteurized concentrate material adapted to form a single drink according to this invention;

Fig. 2 is an elevation, in section, illustrating a preliminary step in forming the article or package unit illustrated in Fig. 1;

Fig. 3 is a fragmentary view similar to Fig. 2, but illustrating a subsequent step in the process;

Fig. 4 is a view similar to Figs. 2 and 3 but illustrating a step subsequent to that shown in Fig. 3 wherein the packaged material is sealed in the protective ice shell or casing, and illustrating the manner in which the filled cups are arranged telescopically to form a stack;

Fig. 5 is an enlarged view generally similar to Fig. 1 but showing a cup construction provided with an optional type of protective interior coating;

Fig. 6 is a view similar to Fig. 4 illustrating the manner in which the empty containers of Fig. 5 nest closely in a stack for economy of space in storage when their spacing means are aligned;

Fig. 7 is a section taken substantially on the plane designated by the line 7—7 in Fig. 6;

Fig. 8 is an enlarged detail view, in section, of the telescoped spacing means of the containers in the position illustrated in Figs. 6 and 7;

Fig. 9 is a view similar to Fig. 6 but showing the position assumed by the cups or containers A and B when their spacing means are out of alignment, forming between each pair of adjacent containers in a stack, a space for accommodating a chamber for containing the concentrate or material to be packaged;

Fig. 10 is a section taken along the plane designated by the line 10—10 in Fig. 9;

Fig. 11 is an enlarged detail view, in section, of the spacing means of the containers in the position illustrated in Fig. 9;

Fig. 12 is an elevation, in section, of an alternative form of container according to this invention, which is formed integrally from a single sheet of metal or other suitable material;

Fig. 13 is a view similar to Fig. 6 but showing containers provided with a modified form of spacing means;

Fig. 14 is a view similar to Fig. 8, but showing the modified form of spacing means illustrated in Fig. 13;

Fig. 15 is a view similar to Fig. 9, but showing containers provided with the modified spacing means shown in Figs. 13 and 14;

Fig. 16 is a view similar to Fig. 11, but showing the cups provided with the spacing means illustrated in Figs. 13 to 15, inclusive;

Fig. 17 is a diagrammatic view, partly in section, illustrating the re-forming of conventional cups or containers to provide them with one form of integral spacing means according to this invention; and Fig. 18 is a diagrammatic view illustrating one manner of applying ice glazes, walls, or coatings to the bottom and side walls of the containers or cups to form open top ice-lined storage chambers and protect the cup walls from attack by the packaged material while strengthening them structurally as shown in Fig. 2.

In the drawings, I have illustrated application of the principles of this invention to the vending in paper cups of unpasteurized fresh citrus and other frozen or "frosted" concentrates, such as milk, which when diluted and mixed with suitable diluents such as water, in proper proportions, forms single drinks comprising cupfuls of a beverage virtually indistinguishable from the original fresh juice, milk, or other beverage.

I have shown in Figs. 1–16 details of preferred forms of the above described integral cup spacing means and their coaction between adjacent telescopically arranged cups to form stacks of paper cups filled or packed with predetermined quantities of concentrate or other material for storage at sub-freezing temperatures and/or vending in coin operated or other vending machines by dilution and/or mixing with suitable diluent in desired proportion either before or after each cup has been removed from a stack (in which it is stored in the vending machine) immediately before delivery to and consumption by a consumer. Where, of course, the cup-packages are to be sold by drug, delicatessen and grocery stores, the packages (Fig. 1) are removed from storage in the stacks and sold intact, the dilution and stirring taking place elsewhere.

In Fig. 17 of the drawing I have illustrated diagrammatically one preferred method and type of apparatus for forming the above described spacing means integrally in commercial paper cups of well known form, cheaply and conveniently.

In Fig. 18, I have illustrated diagrammatically one suitable method and apparatus for coating the bottom and lower side wall portions of a cup with ice by "blast" freezing to form an open top ice-lined chamber 7 (7a, 7b) which, when filled with the packaged material 9 such as pure unpasteurized concentrate, or the like, is hermetically sealed by the sealing wall or layer 8 of ice to form a relatively thin walled shell or casing 7, 8 from which all air has been displaced by the material 9 by which it is completely filled. The sealing wall or layer 8 may be formed in similar manner, in certain cases, after the material 9 is introduced and its top surface levelled when found desirable.

As shown particularly in Figs. 1–4 and 18, the chamber in which the concentrate or other packaged material is contained for storage and/or handling in the container A is coated with chemically inert ice. This illustration container comprises a conventional paper cup of the well known type widely sold under the trade names "Lily" and "Dixie." The tapered side wall 10 of this cup A, at its lower end, is coated with the portion 7a and the bottom wall 12 is coated with the portion 7b of the continuous ice wall 7 which forms an open top ice chamber lining 7 at a temperature below 32° F. (Fig. 2).

Into this chamber lining 7 (Fig. 2) the material 9 to be packaged, stored and/or dispensed is then introduced (Fig. 3) at a temperature ranging between 31° F. and 15° F. and up to 55 Brix, for instance. The top surface of this material 9 in the chamber lining 7 (7a, 7b) is then allowed to level out by settling of the material 9 upon support of the cup A for a suitable interval on a level surface and/or by use of a suitable mechanical spreading or levelling means (not shown) depending upon the Brix of the material 9, the temperature of the package or cup unit and especially this levelled top surface being kept or restored to a temperature below 32° F., the freeze point, so that unfrozen water will not mix therewith.

Now, all air having been displaced or driven from the interior of the chamber lining 7 by the settling of the material 9 below its top surface, and the top surface thereof having been levelled, the sealing wall or layer is applied by introducing free flowing water (preferably of depth approximating the thickness of the wall 7) in liquid state to the chamber on the levelled surface of the concentrate or other material 9 and then frozen to form the ice seal or sealing wall 8 (Fig. 1) which thus becomes integrated with the ice wall or chamber lining 7 (7a, 7b) to form the shell or casing 7, 8 completely encasing the concentrate or material 9 (Figs. 1 and 4). As will be readily understood, since the sheet of water forming the ice seal or sealing wall 8 flows freely before it is frozen, this insures displacement of all air from the interior of the ice shell or casing 7, 8 (Figs. 1, 4). Alternatively, the wall 8 may be formed by "blast" freezing in the same manner as the lining is formed (see Fig. 18).

As pointed out above, this exclusion of all air from contact with the concentrate or other material 9 makes possible the safe and satisfactory storage and handling of the packaged units (Figs. 1 and 4) at temperature ranges but slightly below the freeze point (32° F.) of water instead of from say 10 to 15 Fahrenheit degrees therebelow with the consequent economy hereinbefore explained.

Hereinabove, the side wall 10 of the illustrative container (which is of general frusto-conical form) has been described as tapered. This decription covers also the side walls of commercial paper cups of conical form wherein the cup is formed entirely by a single tapered wall, and to which type of cup the principles of this invention are, of course, readily adapted and, in some cases, preferably applied.

The illustrative form of container, designated A in Figs. 1–11 has the conventional tapered side wall 10 turned over or rolled upon itself at its upper end or edge to form the reinforcing bead or lip 11, while its lower end or edge portion is secured to the disk-like bottom wall 12 by means of the flange 10a clinched to the peripheral downturned marginal flange 12a of the bottom wall 12 (Figs. 1, 4, 5) to form a fluid tight joint between the side and bottom cup walls.

Alternatively, the cups or containers may be formed integrally of molded non-metallic plastic or like material, or of thin metal or other similar material drawn or stamped to final shape as shown in Fig. 12. The illustrative cups C therein shown have the sidewalls 10c and bottom walls 12c thereof formed integrally, with the bottom walls 12c preferably arched for strength, especially in the case of metal.

As shown in Fig. 5, where the material to be packaged comprises a material which is highly corrosive or destructive to paper, a protective coating 17 of a suitable inert material such as "water glass," cellulose acetate and/or other suitable chemically inert resinous or other non-metallic coating material or composition may be applied to the interior (or to both interior and exterior) of the above described cup or container A before application of the ice chamber lining 7 (7a, 7b) either as an addition to the common and conventional wax and other paper coatings used on commercial paper cups or as a substitute therefor. These protective coatings such as 17 are most generally unnecessary because the chemically inert ice shell or casing 7, 8, while unmelted and intact, prevents any chemical reaction between the material 9 confined therein, in the absence of air, and the cup walls or anything whatsoever outside the interior of the shell or casing 7, 8.

I have, in fact, discovered that a higher degree of firm attachment than otherwise is secured between the ice shell or casing 7, 8 and the surfaces of the interior of the cup where the conventional wax or other coatings are omitted from the surfaces engaged by the shell or casing 7, 8 and, the firmer the attachment of the cup walls to the ice walls of the shell, the higher the degree of stiffening and reinforcement effected upon the paper walls by the ice walls of the shell 7, 8. As will be understood, the omission of these conventional wax and other coatings effects a very appreciable reduction in cup cost.

Now, for the purpose of this invention, as stated above, I have provided spacing means (preferably in multiples of three) on each cup, which spacing means comprises bosses or projections 15 of such character, extent and location that they will nest telescopically with one another when radially aligned to permit closely spaced stacking of the containers when they are empty as shown in Figs. 6, 7, 8 and 12. When the cups are filled and stacked with the spacing means or bosses 15 of adjacent containers or cups out of radial alignment, the bosses 15 of one cup or container such as A (Fig. 9) will engage frusto-conical wall portions of the adjacent cup or container B, to center the cups coaxially with respect to one another, to maintain predetermined axial spacing therebetween, and to limit the contact area therebetween, as shown in Figs. 9, 10 and 11. Such spacing effects the formation of adequate chamber space for receiving and storing the material 9 to be packaged which space is designated 16 in Fig. 9.

The resultant structure (Figs. 1–12) may be readily and economically produced by re-forming conventional "Lilies" or "Dixies" by the use of moist heat (such as steam) and localized forming pressure (complementary male and female dies) applied at opposite sides of the sidewall 10 at predetermined points or localized areas (see Fig. 17).

In re-forming or modifying conventional or commercial cups, the structure shown diagrammatically in Fig. 17 and the practice diagrammatically shown therein may be followed, as stated above. According to the teaching diagrammatically illustrated therein, a conventional cup A is placed in the recess 21 of the stationary die 20 provided with sub-recesses 23 complementary with the outer surface desired on the spacing means or bosses 15 (or 15d, 15e), the die 20 being provided with ducts 24 suitably located for supplying steam to the outside portions of the sidewall 10 to be formed into the bosses or projections 15 (or 15d, 15e). Cooperating with the stationary die 20 is a plunger 25 provided with a male die 26 having thereon projections 27 complementary with the above described sub-recesses 23 and with the inside contour desired in the bosses 15 (or 15d, 15e). Leading to portions of the die 26 adjacent the projections 27, and/or therethrough, are ducts 28 supplying steam from the central bore 29 in the plunger 25.

After a cup (as A) is seated in the recess 21, steam is admitted through ducts 24 of die 20 to contact with the cup wall areas exposed in the sub-recesses 23. The plunger 25 is then depressed and steam admitted through bore 29 and ducts 28 to aid the steam of ducts 24 in softening of the localized wall portions. Then, after an extremely short interval, the plunger 25 is quickly advanced to its lowermost position. The steam feed is then cut off, the plunger raised and the cup or container A, with the newly formed bosses or projections 15 (comprising the spacing means) is removed.

Where the containers (C, Fig. 12) are formed of molded non-metallic plastic, the spacing means or bosses 15 are formed during molding, and where the cups or containers C are formed of metal, the spacing means or bosses 15 may be formed in the sidewalls 10c during formation of the container C, or thereafter, by a separate die stamping operation.

In any case, the location of the projections or bosses 15 and their transverse extent is such that, when they are engaged with the inclined or tapered sidewall surfaces of adjacent cups or containers (i. e., out of alignment and incapable of close nesting), the axial spacing of the adjacent cups (such as A and B, Figs. 9–11) is of such extent as to form therebetween the above-described chamber space 16 (Fig. 9) of such volume or extent as to be capable of containing a predetermined volume of packaged material, out of contact with the cup or container thereabove. This volume bears a definite fractional relationship to the entire volume or capacity of the cups or containers (as A and B). Thus, by filling the cup with water or other suitable diluent, an accurate mixture of material and diluent is achieved. For instance, the frozen citrus and other juices now predominant in the commercial markets are supplied in small metal cans. To use this frozen concentrated product, the can must be opened mechanically, the semisolid but fluent concentrate must then be placed in a vessel (a "pitcher" is generally recommended); the can must then be filled with water three times and the water poured into the vessel (or "pitcher") and stirred with the concentrate.

According to this invention, a filled container or cup may be removed from one end of a stack, the cup or container filled substantially to the brim with water and the contents of the cup or container stirred with the water. Alternatively, the dilution and stirring may occur before removal of the cup from the stack.

The above described limitation of area of contact between filled cups or containers in a stack (see Figs. 4, 9, 10, 11) facilitates removal of a filled cup or container from a stack thereof (Figs. 4 and 9) since the total adhesive power of the thickest ice coatings when spread over such slight area is inappreciable and no thawing is necessary to free the filled cups for removal from the stack previous to dilution of the contents, stirring, and consumption, although thawing may precede individual cup removal as described above.

While one form of integral cup spacing means, namely 15, is shown in Figs. 1–12, 17 and 18, another illustrative preferred integral form is shown in Figs. 13, 14, 15 and 16. This spacing means is generally similar to the spacing means 15 being a reversal thereof in that the bosses or members 15d and 15e project inwardly of the cup walls 10 instead of outwardly as do the spacing means 15. Like the members 15, they extend substantially radially with respect to the axes of the cups, are of similar extent, and substantially equivalent functionally to the above described members 15 shown in Figs. 1–12, 17 and 18.

In Fig. 18, I have shown diagrammatically one method of providing the continuous ice wall or coating 7 (7a, 7b) on the bottom wall 12 and lower portion of the side wall 10 of the cup A. The method comprises directing a combined spray of water and carbon dioxide ($H_2O$ and $CO_2$) on the surfaces to be coated as shown diagrammatically in Fig. 18. The cup A is supported on a suitable base (not shown) which may be either stationary or in the form of an intermittently operated travelling conveyor. Into the cup carried on the conveyor (such as A) during dwell periods a vertically reciprocating double conduit is inserted in the cup, which conduit comprises a $CO_2$ gas feed pipe with a diffusing nozzle 32 at its lower end, with a water supply pipe 33 surrounding the gas feed pipe and forming a water supply channel 34 therebetween. At its lower end, the water supply pipe 33 is provided with a spray nozzle head 35 surrounding the above described diffusing nozzle 32 of the gas feed pipe. This spray nozzle head is closed and flaring, and is provided with atomizing apertures 36, directing downwardly and radially laterally a water-carbon dioxide spray. A shield 37, provided with a peripheral seal 37a for engaging the cup wall 10 is slidable upwardly and downwardly on the above described water supply pipe 33, and an annular flange 33a is provided on the pipe 33 to provide a rest for the shield 37. When the seal 37a engages the wall 10, the shield 37 remains in wall-engaging position while the gas and water feed pipe continue moving downwardly, but upon reverse movement of the pipes, the flange or shoulder 33a engages the shield 37 and lifts it upwardly beyond the interior of the cup A.

As hereinabove stated, it is necessary, properly to preserve unpasteurized canned citrus and other concentrates, that the upper limit of the temperature range be from 10 to 15° lower than the freeze point of water (32° F.). Since there is air entrapped in the can as explained above, the bacteria and other organisms will work and multiply if the storage temperature range rises above the upper limit stated. Since the can is hermetically sealed, the working and/or multiplication of the organisms will cause pressure to build up until, if the storage temperature range remains too high for a time exceeding a given period, the pressure becomes so great that the can will, in effect, become a bomb and explode with great force and destruction. In the case of the cup or package units formed according to this invention as shown in Figs. 1 and 4, no such damaging effect is caused by accidental rise of the temperature upwardly beyond the safe range, since the ice seal or casing 7, 8 will melt above the freeze point (32° F.) and any pressure will be released to the atmosphere. As a matter of fact, this melting of the seal or casing 7, 8, will occur very soon after the temperature of the contents of the package or cup A rises above the freeze point (32° F.), therefore, because there is no air entrapped within the sealed shell or casing 7, 8, there will be no such damage as is described immediately hereinabove.

As hereinabove pointed out, concentrates and other materials packaged according to my invention, remain within the cup A from the time they are packaged until the contents of the cups are processed and removed from a vending machine for consumption; thus the problems of sterility, cleanliness and hygiene which are insuperable by other methods of packaging such materials, are simply non-existent. During the short-time interval when the package material and ice seal or casing are thawed and mixed or stirred with diluent, such as water (by a suitable temperature controlled diluent or water supply needle jet for instance, not shown) since the contents of the cup remain within the cup, leakage, dripping or deposition on surfaces outside the cup (which would require frequent cleaning and/or sterilization) are completely prevented by retention of the cup contents in the cups.

The applications of the principles of this invention to the packaging, storage or handling of food and/or beverage forming concentrates such as fruit and vegetable juice concentrates for dispensing and/or vending, especially in coin operated machines or devices are extremely important. These concentrates, included above in the term "fluent materials," are fluent (i. e., can be poured) at the temperatures at which they are introduced into the open top iced walled storage chamber lining 7 (7a, 7b) so that a quantity of the material in flowing and settling into this chamber lining will displace all air from the chamber below its top surface which will become levelled by the flow. The sheet of free flowing water (which later becomes the ice seal or sealing wall 8 when frozen) displaces all air above the level top surface of the concentrate while liquid and becomes integrated with the previously frozen lining wall 7 (7a, 7b) when frozen to form the hermetically sealed shell or casing 7, 8 which contains and encloses the concentrate hermetically in the total absence of air. While some concentrates because of the Brix at the temperature of introduction are barely fluent and will flow slowly and with reluctance, it is sometimes found desirable to subject the same to mechanical treatment (i. e., levelling) to speed up the process and reduce the time interval between introduction (pouring in) of the concentrate and introduction of the sheet of water which becomes the seal, or seal wall 8.

When the material is fluent at temperatures above 32° F. and if the temperature of introduction is greatly above 32° F., the entire unit is subjected to a quick freezing step which solidifies the concentrate immediately after it has flowed into and filled the chamber lining 7 and evacuated the air therefrom (below its top surface after it has become levelled) but before the lining 7 has been damaged (i. e., appreciably melted).

It is, of course, to be understood that these principles are capable of application also to unconcentrated juices, and liquid-solid mixtures which are fluent (i. e., can be poured) at such temperatures as are suitable for their introduction to the ice walled chamber lining 7 of the storage chamber and that such applications are contemplated by me, as well as chemicals, pharmaceuticals, cultures, etc.

The main distinction between the concentrates and the unconcentrated materials resides in the fact that the concentrate provides economy in storage space or volume until it is diluted and expanded immediately prior to use. Thus, in applications of the principles of this invention to unconcentrated materials of the types enumerated above, the volume or capacity provided in the material storage chamber is, in most cases, substantially equal to the volume or capacity of the entire package container. This is the most economical arrangement under the circumstances since there is no expansion or increase in volume of the material in the absence of dilution and no need, or advantage, in the provision of additional volume or expansion space in the package container.

Generally, where the fluent materials packaged such as unconcentrated citrus and other fruit juices, for instance, are highly liquid and free flowing there is, of course, no need for mechanical levelling of the top surface of the material which must support the above-described sheet of water which, when frozen, forms the sealing wall or layer 8; however, in some such cases it is found desirable to lower the temperature of the material in the chamber lining 7 sufficiently to render the top surface firm and capable of supporting the unfrozen water sheet without the occurrence of mixing between the water and the material before the water is frozen to form the ice seal or wall 8.

Since it is of utmost importance that all air be displaced from the ice walled chamber lining 7 below the top surface of the material 9 before the formation of the ice seal or wall completes this air displacement or evacuation, the temperatures of introduction or admission of the fluent materials introduced will vary as widely as do the properties and type of the materials packaged.

As pointed out above, mechanical levelling of the top surface of the material may be desirable in some cases to facilitate this flow, settling, and/or displacement for speeding the packaging operation, and the process. In other cases, the problem is the prevention of mixing of the material with the sheet of water which (when frozen) forms the ice seal or wall 8 and an additional step of freezing the material to "firm" the top surface of the packaged material before superposing the water sheet provides the solution.

As pointed out above, the cups may be stored in stacks in drug, grocery and delicatessen and other stores and shops and the units be sold in quantities of one or more intact, the unthawed cup-packages or one-drink units being intended to be thawed, diluted and/or mixed by the vendees elsewhere and later, if they so desire. The invention is likewise adapted to the use of other types of containers, the forms, capacities and constructions of which containers may be varied, as desired, for adaptation to the uses for which intended. For instance, the containers may be of open top type, like the illustrated cups, or may comprise closed canisters, drums, tubs, boxes etc., constructed of any suitable size and material including paper, card or paper-board, wood or plywood, metal, plastic etc., or combinations of the same; in short, the illustrated paper cups comprise but one type of many types of containers adapted for use in my invention.

From the above description, and the drawing, it will clearly appear that I have provided a new and improved method of packaging, storing, and vending the above described and enumerated type of materials which makes possible the vending of some of these materials which could not heretofore be vended or commercially dispensed satisfactorily by previously known methods; that use of this method makes possible very great simplification of vending apparatus and, in particular, of coin operated vending apparatus while raising the temperature ranges at which the materials may be stored, resulting in very substantial economy as does also the reduction in labor and cost of repairs, sterilization and cleaning of the apparatus utilized.

It is, of course, to be understood that the above description is merely illustrative and in nowise limiting, and that I desire to comprehend within my invention such modifications as are included within the scope of the following claims, and the invention.

Having thus fully described my invention, what I claim as new and desire to secure by Letters Patent is:

1. A new article of manufacture for storing fruit juices adapted for preservation at subfreezing temperatures comprising a container having an interior chamber, an ice shell secured in said interior chamber and a quantity of fruit juice completely enclosed and sealed within said ice shell in the absence of air, said fruit juice being carried directly in said ice shell and maintained out of contact with the interior surfaces of said chamber by said ice shell.

2. A new article of manufacture for storing concentrated fruit juice beverages at subfreezing temperatures comprising a container of predetermined capacity, an ice walled casing in said container adjacent the lower end thereof, and a predetermined quantity of a concentrated fruit juice beverage completely enclosed and sealed in said ice walled casing in the absence of air, the quantity of concentrated fruit juice beverage being such that upon thawing of said casing and contents and addition and admixture therewith of a diluent substantially filling said container a fruit juice beverage of predetermined concentration is obtained.

3. An article as defined in claim 2, in which said container is formed of paper.

4. A new article of manufacture comprising a paper cup, a continuous layer of ice coating the bottom wall and at least a portion of the side walls of said cup forming a chamber within said cup, a predetermined quantity of frozen beverage forming concentrate comprising unpasteurized fruit juice in said chamber, said concentrate being in direct contact with said ice layer, and a sealing layer of ice united with said first-named ice layer and sealing said concentrate in said chamber in the absence of air.

5. The article defined in claim 4, said beverage forming concentrate comprising unpasteurized concentrated citrus fruit juice.

6. A new article of manufacture comprising a paper cup with a tapered side wall, a continuous layer of ice coating the bottom wall and at least a portion of the side walls of said cup forming a chamber within said cup, a predetermined quantity of frozen beverage forming concentrate comprising unpasteurized fruit juice in said chamber, said concentrate being in direct contact with said ice layer, and sealing layer of ice united with said first-named ice layer and sealing said concentrate in said chamber in the absence of air, the quantity of frozen beverage forming concentrate being such that upon thawing thereof and admixture therewith of a diluent substantially filling such cup a beverage of predetermined concentration is obtained.

7. A method of packaging fruit juices adapted for storage at sub-freezing temperature ranges in disposable containers with bottom and side walls comprising, coating bottom and side wall areas with a continuous ice layer forming an open top ice walled chamber, substantially filling said ice walled chamber with the fruit juice to be packaged, and hermetically sealing said material in said chamber in the absence of air by an ice sealing layer united with said first named continuous chamber forming ice layer.

8. The method defined in claim 7, said continuous chamber forming ice layers being applied to the lower ends of said containers by blast freezing.

9. A method of packaging beverage forming fruit juice concentrates adapted for storage at sub-freezing temperature ranges in a disposable paper container comprising, forming an open top ice walled chamber in said container, substantially filling said ice walled chamber with the concentrate in fluent state, and hermetically sealing said material in said chamber in the absence of air with an ice sealing layer united with said first named continuous chamber forming ice layer.

10. In a method of packaging in a paper cup unpasteurized beverage forming fruit juice concentrates capable of preservation at sub-freezing temperatures, the steps of coating a portion of the interior of said cup with a continuous ice wall forming an open top chamber, introducing said concentrate in fluent state into said chamber, leveling the top surface of said concentrate, forming on said levelled concentrate surface an ice sealing wall covering said surface and united with said ice chamber wall while evacuating all air from the interior of said chamber to form an ice shell enclosing said concentrate in the total absence of air.

11. The method defined in claim 10, said chamber forming ice wall being applied to the interior of said cup by a spray comprising water and carbon dioxide before said concentrate is introduced into the chamber formed thereby, and said ice sealing wall being formed in like manner after said concentrate is introduced into said chamber and its top surface is levelled.

12. In a method of packaging in paper cups concentrated unpasteurized beverage forming fruit juice capable of preservation at sub-freezing temperature ranges, the steps of coating a portion of the interior of said cup with a continuous ice wall forming an open top chamber, pouring a predetermined quantity of said concentrated fruit juice in fluent state into said chamber, pouring on the upper surface of said concentrated fruit juice a sheet of water in liquid state to cover said surface and unite with said ice wall while evacuating all air from the interior of said chamber, and freezing said sheet of water to form an ice seal wall forming with said first named ice wall an integral ice shell enclosing said concentrated fruit juice in the total absence of air.

13. The method according to claim 12 comprising in addition freezing said predetermined quantity of said concentrated fruit juice after it has been poured into said chamber and before the sheet of water is poured upon the upper surface thereof.

14. A method of packaging unpasteurized beverage forming citrus juice concentrates for dispensing from stacked nested paper cups having tapered side walls comprising, forming in the lower end of each cup an ice walled open top chamber, substantially filling said chambers with concentrate and, sealing said concentrate hermetically in said chambers in the absence of air by ice sealing layers integrated with said ice walled chambers.

HENRY A. SIMPSON.

References Cited in the file of this patent

UNITED STATES PATENTS

| Number | Name | Date |
|---|---|---|
| 663,502 | Lain | Dec. 11, 1900 |
| 1,538,199 | Maxwell | May 19, 1925 |
| 1,768,768 | Johnson | July 1, 1930 |
| 1,770,118 | Williams | July 8, 1930 |
| 1,896,529 | Tressler et al. | Feb. 7, 1933 |
| 1,937,402 | Cherry | Nov. 28, 1933 |
| 2,048,041 | Warren et al. | July 21, 1936 |
| 2,088,181 | Swift | July 27, 1937 |
| 2,091,723 | Sterino | Aug. 31, 1937 |
| 2,304,860 | Taylor | Dec. 15, 1942 |
| 2,463,370 | Flaster | Mar. 1, 1949 |
| 2,522,221 | Gorton | Sept. 12, 1950 |
| 2,531,210 | Gilson | Nov. 21, 1950 |
| 2,563,352 | Morse | Aug. 7, 1951 |